United States Patent
Mukai

(10) Patent No.: US 9,952,574 B2
(45) Date of Patent: Apr. 24, 2018

(54) MACHINE LEARNING DEVICE, MOTOR CONTROL SYSTEM, AND MACHINE LEARNING METHOD FOR LEARNING CLEANING INTERVAL OF FAN MOTOR

(71) Applicant: FANUC CORPORATION, Yamanashi (JP)

(72) Inventor: Yasuhito Mukai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 4 days.

(21) Appl. No.: 15/334,265

(22) Filed: Oct. 25, 2016

(65) Prior Publication Data
US 2017/0155354 A1    Jun. 1, 2017

(30) Foreign Application Priority Data
Nov. 27, 2015   (JP) ................... 2015-232084

(51) Int. Cl.
| H02P 3/00 | (2006.01) |
| G05B 15/02 | (2006.01) |
| G06N 99/00 | (2010.01) |
| H02P 23/00 | (2016.01) |

(52) U.S. Cl.
CPC ........... G05B 15/02 (2013.01); G06N 99/005 (2013.01); H02P 23/0031 (2013.01)

(58) Field of Classification Search
CPC ........ H02P 31/00; G06N 99/005; G05B 15/02

USPC .......................................................... 318/490
See application file for complete search history.

(56) References Cited

U.S. PATENT DOCUMENTS

| 2006/0155660 A1* | 7/2006 | Koshizen | G05B 13/0265 706/18 |
| 2006/0195227 A1* | 8/2006 | Sabe | G05B 13/021 700/245 |
| 2010/0318480 A1* | 12/2010 | Kim | G06N 99/005 706/12 |
| 2013/0342142 A1* | 12/2013 | Marcinkiewicz | H02P 6/205 318/400.11 |
| 2014/0046483 A1* | 2/2014 | Oaki | B25J 9/1633 700/253 |
| 2015/0081110 A1* | 3/2015 | Houston | G05D 19/02 700/280 |

FOREIGN PATENT DOCUMENTS

| JP | 2005-249277 A | 9/2005 |
| JP | 2007-164406 A | 6/2007 |

* cited by examiner

*Primary Examiner* — Bentsu Ro
*Assistant Examiner* — Gabriel Agared
(74) *Attorney, Agent, or Firm* — Hauptman Ham, LLP

(57) ABSTRACT

A machine learning device which learns the cleaning frequency of a fan motor which cools an electric motor mounted in a machine includes a state observation unit which observes the state of the machine, and a learning unit which updates an action value table for cleaning the fan motor, on the basis of a state variable observed by the state observation unit. This can improve both the life of the electric motor and the operating ratio of the machine.

13 Claims, 7 Drawing Sheets

[CONVERTED INTO REWARD]

FIG. 8

| NUMBER | COMPARISON WITH PREDICTED TEMPERATURE OF MOTOR | MACHINE OPERATING RATIO | CLEANING INTERVAL | CURRENT STATE | SUBSEQUENT STATE | ACTION VALUE |
|---|---|---|---|---|---|---|
| N1 | LARGE (−10) | −10 | HIGH (+10) | +10 | SHORTENED | 0 | +15 | +15 |
| N2 | LARGE (−10) | −10 | HIGH (+10) | +10 | PROLONGED | 0 | 0 | 0 |
| N3 | MODERATE (+6) | +6 | HIGH (+10) | +10 | SHORTENED | +16 | +15 | −1 |
| N4 | MODERATE (+6) | +6 | HIGH (+10) | +10 | PROLONGED | +16 | +16 | 0 |
| N5 | SMALL (+10) | +10 | HIGH (+10) | +10 | SHORTENED | +20 | +15 | −5 |
| N6 | SMALL (+10) | +10 | HIGH (+10) | +10 | PROLONGED | +20 | +20 | 0 |
| N7 | LARGE (−10) | −10 | MODERATE (+5) | +5 | SHORTENED | −5 | +10 | +15 |
| N8 | LARGE (−10) | −10 | MODERATE (+5) | +5 | PROLONGED | −5 | 0 | +5 |
| N9 | MODERATE (+6) | +6 | MODERATE (+5) | +5 | SHORTENED | +11 | +10 | −1 |
| N10 | MODERATE (+6) | +6 | MODERATE (+5) | +5 | PROLONGED | +11 | +16 | +5 |
| N11 | SMALL (+10) | +10 | MODERATE (+5) | +5 | SHORTENED | +15 | +10 | −5 |
| N12 | SMALL (+10) | +10 | MODERATE (+5) | +5 | PROLONGED | +15 | +20 | +5 |
| N13 | LARGE (−10) | −10 | LOW (0) | 0 | SHORTENED | −10 | +10 | +20 |
| N14 | LARGE (−10) | −10 | LOW (0) | 0 | PROLONGED | −10 | −5 | +5 |
| N15 | MODERATE (+6) | +6 | LOW (0) | 0 | SHORTENED | +6 | +10 | +4 |
| N16 | MODERATE (+6) | +6 | LOW (0) | 0 | PROLONGED | +6 | +11 | +5 |
| N17 | SMALL (+10) | +10 | LOW (0) | 0 | SHORTENED | +10 | +10 | 0 |
| N18 | SMALL (+10) | +10 | LOW (0) | 0 | PROLONGED | +10 | +15 | +5 |

MACHINE LEARNING DEVICE, MOTOR CONTROL SYSTEM, AND MACHINE LEARNING METHOD FOR LEARNING CLEANING INTERVAL OF FAN MOTOR

RELATED APPLICATIONS

The present application claims priority to Japanese Patent Application Number 2015-232084 filed Nov. 27, 2015, the disclosure of which is hereby incorporated by reference herein in its entirety.

BACKGROUND OF THE INVENTION

1. Field of the Invention

The present invention relates to a machine learning device, a motor control system, and a machine learning method for learning the cleaning interval of a fan motor.

2. Description of the Related Art

Conventionally, machines such as NC (Numerical Control) machine tools and robots are equipped with electric motors (driving motors), and fan motors are generally provided to dissipate heat released from such driving motors.

Since NC machine tools, robots, and the like are used in, e.g., factories having various dust particles, dirt adheres to or dust accumulates in, e.g., fan motors and air vents, thus lowering the cooling capacities of driving motors. Therefore, the users of machines such as NC machine tools, robots, and the like may preferably clean fan motors and air vents ("to clean fan motors and air vents" will also be referred to as "to clean fan motors" hereinafter).

When the cooling capacity of a fan motor declines, this raises the temperature of the driving motor and especially the temperature of the grease in the bearings of the driving motor. The life of the motor is considerably related to the life of the grease in the bearings and the life of the grease is significantly influenced by temperature. In other words, the life of the grease is known to shorten with increased temperature and, for example, the life of the grease may shorten by several tens of thousands of hours when the temperature of the grease increases only by about 10° C.

Conventionally, Japanese Laid-open Patent Publication No. 2005-249277 (Patent Document 1), for example, proposes a technique for conducting maintenance works on fans (fan motors) at optimal timings.

As described above, for example, the users of machines such as NC machine tools, robots, and the like may preferably clean fan motors (clean fan motors and air vents), and the cleaning intervals of the fan motors (the cleaning timings of the fan motors) are determined on the basis of empirical rules, including the technique disclosed in Patent Document 1.

For example, Patent Document 1 discloses determining that a maintenance period has come when the difference between the initial characteristics of the total preferable airflow volume vs. fan rotational speed stored in an initial characteristic storage unit and the actual characteristics obtained from a characteristic correction/update unit falls outside a predetermined range. Even in this case, however, the predetermined range for the difference between the initial characteristics of the fan (fan motor) and the actual characteristics is determined depending on empirical rules.

When the fan motor is too seldom cleaned, for example, the temperature of the driving motor rises and the life of the driving motor (or the machine including the driving motor) reduces. When the fan motor is cleaned too frequently, for example, the operating ratio of the machine lowers and the productivity, in turn, lowers.

In consideration of the above-described problem, it is an object of the present invention to provide a machine learning device, a motor control system, and a machine learning method which can improve both the life of an electric motor and the operating ratio of a machine.

SUMMARY OF INVENTION

According to a first aspect of the present invention, there is provided a machine learning device which learns a cleaning frequency of a fan motor which cools an electric motor mounted in a machine, including a state observation unit which observes a state of the machine; and a learning unit which updates an action value table for cleaning the fan motor, on the basis of a state variable observed by the state observation unit.

The state observation unit observes a state variable representing at least one of a current, a voltage, a temperature, and a slip of the electric motor, a cleaning interval of the fan motor, and an operating ratio of the machine, and the learning unit updates the action value table for cleaning the fan motor, on the basis of the state variable representing the at least one of the current, the voltage, the temperature, and the slip of the electric motor, the cleaning interval of the fan motor, and the operating ratio of the machine, observed by the state observation unit.

The state observation unit may receive a first state variable representing the current, the voltage, the temperature, and the slip of the electric motor from the electric motor as a feedback signal to an electric motor control unit which controls the electric motor, and may receive a second state variable representing the cleaning interval of the fan motor and the operating ratio of the machine from the electric motor control unit. The state observation unit may further observe a state variable representing an ambient temperature of the electric motor, and the learning unit may update the action value table for cleaning the fan motor, in consideration of the state variable representing the ambient temperature of the electric motor observed by the state observation unit, as well. The state observation unit may receive a third state variable representing an ambient temperature of the electric motor from a temperature measuring unit located near the electric motor.

The learning unit may include a reward computation unit which computes a reward on the basis of the state variable observed by the state observation unit; and a value function update unit which updates a function for determining an amount of change in the cleaning interval of the fan motor from a current state variable, on the basis of the reward computed by the reward computation unit. The machine learning device may further include a decision unit which decides whether the fan motor is to be cleaned from the current state variable, on the basis of a result of learning by the learning unit.

The reward computation unit may provide a smaller reward on the basis of prolongation of the cleaning interval of the fan motor, a reduction in a difference between the observed temperature of the electric motor and a predicted temperature of the electric motor, or a reduction in the operating ratio of the machine, and may provide a larger reward on the basis of shortening of the cleaning interval of the fan motor, an increase in the difference between the observed temperature of the electric motor and the predicted temperature of the electric motor, or an increase in the operating ratio of the machine. The machine learning device may further include an alarm output unit which outputs an alarm on the basis of output from the decision unit when the fan motor is cleaned. The machine learning device may further include a neural network.

According to a second aspect of the present invention, there is provided a motor control system including a plurality of machine learning devices each of which, and a data exchange unit, the machine learning device learns a cleaning frequency of a fan motor which cools an electric motor mounted in a machine. The machine learning device includes a state observation unit which observes a state of the machine; and a learning unit which updates an action value table for cleaning the fan motor, on the basis of a state variable observed by the state observation unit. The data exchange unit exchanges data between the plurality of machine learning devices, wherein a function updated by a value function update unit of one machine learning device among the plurality of machine learning devices is used to update functions of value function update units of the remaining machine learning devices. The motor control system may include a plurality of electric motors and a plurality of fan motors, and the machine learning device may be provided in correspondence with each of the fan motors to share or exchange the state variables learned by the machine learning devices, via a communication medium.

According to a third aspect of the present invention, there is provided a machine learning method for learning a cleaning frequency of a fan motor which cools an electric motor mounted in a machine, the method including observing a state of the machine; and updating an action value table for cleaning the fan motor, on the basis of an observed state variable. Observing the state of the machine may include observing a state variable representing at least one of a current, a voltage, a temperature, and a slip of the electric motor, a cleaning interval of the fan motor, and an operating ratio of the machine, and updating the action value table for cleaning the fan motor may include updating the action value table for cleaning the fan motor, on the basis of the observed state variable representing the at least one of the current, the voltage, the temperature, and the slip of the electric motor, the cleaning interval of the fan motor, and the operating ratio of the machine. Observing the state of the machine further includes observing a state variable representing an ambient temperature of the electric motor, and updating the action value table for cleaning the fan motor may include updating the action value table for cleaning the fan motor, in consideration of the observed state variable representing the ambient temperature of the electric motor, as well.

BRIEF DESCRIPTION OF THE DRAWINGS

The present invention will be more clearly understood by reference to the accompanying drawings, in which:

FIG. 8 is a table illustrating an exemplary action value table used in the machine learning device illustrated as FIG. 1.

DETAILED DESCRIPTION

Figure 1:
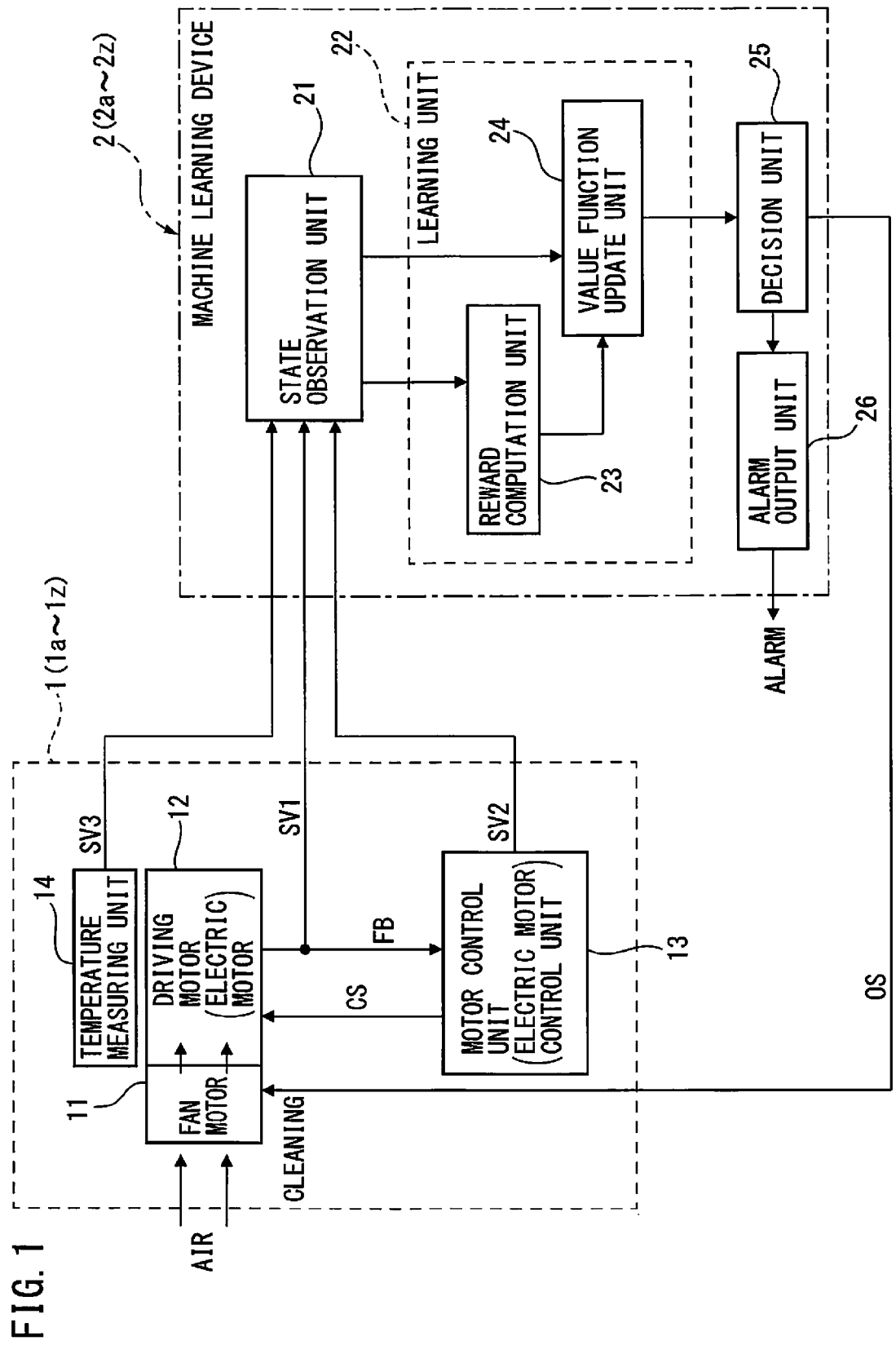
FIG. 1 is a block diagram schematically illustrating an embodiment of a motor control system according to the present invention.

Embodiments of a machine learning device, a motor control system, and a machine learning method according to the present invention will be described in detail below with reference to the accompanying drawings. FIG. 1 is a block diagram schematically illustrating an embodiment of a motor control system according to the present invention.

For the sake of simplicity, the case where one fan motor 11 is provided to one driving motor 12 controlled by a motor control unit 13 and the cleaning interval of the fan motor 11 is learned by a machine learning device 2 will be taken as an example below. In addition, cleaning of the fan motor 11 either automatically or manually by the operator will be simply referred to as "cleaning of the fan motor 11" hereinafter. The cleaning of the fan motor 11 does not mean cleaning of only the fan motor 11, but it includes various cleaning operations such as removal of dirt and clogging of air vents.

The motor control system according to this embodiment includes a machine 1 and a machine learning device 2, as illustrated as FIG. 1. The machine 1 includes an electric motor (driving motor) 12 for an NC machine tool, a robot, or the like and heat released from the driving motor 12 is dissipated by the fan motor 11. The machine 1 further includes an electric motor control unit (motor control unit) 13, which controls the driving motor 12, and a temperature measuring unit 14.

The machine 1 may include a plurality of driving motors 12 and further include a plurality of fan motors 11, which cool the driving motors 12, in correspondence with the number of driving motors 12. A plurality of fan motors 11 may even be provided to one driving motor 12. The motor control unit 13 can control a plurality of driving motors 12, as a matter of course.

As depicted as FIG. 1, the machine learning device 2 learns the cleaning frequency of the fan motor 11 that cools the driving motor 12 mounted in the machine 1, and includes a state observation unit 21, a learning unit 22, and a decision unit 25. The state observation unit 21 observes the state of the machine 1 and the learning unit 22 updates an action value table for cleaning the fan motor 11, on the basis of a state variable observed by the state observation unit 21. In other words, the state observation unit 21 observes state quantities representing the current, the voltage, the temperature, and the slip of the driving motor 12, the cleaning interval of the fan motor 11, and the operating ratio of the machine 1. The state observation unit 21 may be located near, e.g., the driving motor 12 and observe as a state variable, the output (the ambient temperature of the driving motor 12) from the temperature measuring unit 14 that measures the ambient temperature of the driving motor 12.

The state observation unit 21 receives, e.g., state quantities (first state quantities) SV1 representing the current, the voltage, the temperature, and the slip of the driving motor 12 as a feedback signal FB from the driving motor 12 to the motor control unit 13. In other words, the motor control unit 13 outputs a control signal CS to the driving motor 12 to control the driving motor 12, and receives the state variable representing the current, the voltage, the temperature, and the slip of the driving motor 12 from the driving motor 12 as a feedback signal FB. The feedback signal FB is sent to the state observation unit 21 of the machine learning device 2 as a first state variable SV1.

The state observation unit 21 further receives, e.g., state quantities (second state quantities) SV2 representing the cleaning interval of the fan motor 11 and the operating ratio of the machine 1 from the motor control unit 13. The state observation unit 21 even receives, e.g., a state variable (third state variable) SV3 representing the ambient temperature of the driving motor 12 from the temperature measuring unit 14 located near the driving motor 12.

The learning unit 22 includes a reward computation unit 23 which computes a reward on the basis of the state quantities observed by the state observation unit 21, and a value function update unit 24 which updates a function for determining the amount of change in cleaning interval of the fan motor 11 from the current state quantities (state variables), on the basis of the reward computed by the reward computation unit 23. The reward computation unit 23 computes a reward from, e.g., the current and voltage values (some of the first state quantities SV1) of the driving motor 12, the predicted temperature of the driving motor 12 based on the ambient temperature (third state variable SV3) of the driving motor 12, and the cleaning interval of the fan motor 11 and the operating ratio (second state quantities SV2) of the machine 1.

The life of the driving motor 12 is nearly equal to that of a bearing, i.e., considerably related to the life of the grease in the bearing. The life of the grease shortens with increased temperature, as described earlier. Exemplary simple computation can be described as, e.g., $\Delta T$ (Rise in Temperature of Motor)=\{(Voltage)$\times$(Current)−(Output)−(Cooling Capacity)\}/(Heat Capacity). When the fan motor is too seldom cleaned, for example, the temperature of the driving motor rises and the life of the driving motor (or the machine including the driving motor) reduces. When the fan motor is cleaned too frequently, for example, the operating ratio of the machine lowers and the productivity, in turn, lowers.

In view of this, the reward computation unit 23, for example, provides a smaller reward on the basis of prolongation of the cleaning interval of the fan motor 11, a reduction in difference between the observed temperature of the driving motor 12 and the predicted temperature of the driving motor 12, or a reduction in operating ratio of the machine 1, and conversely provides a larger reward on the basis of shortening of the cleaning interval of the fan motor 11, an increase in difference between the observed temperature of the driving motor 12 and the predicted temperature of the driving motor 12, or an increase in the operating ratio of the machine 1.

The value function update unit 24 updates a value function (an action value table for cleaning the fan motor 11) on the basis of the reward from the reward computation unit 23. The value function may also be, for example, stored in a memory built into the machine learning device 2 or transmitted to another machine learning device 2 via, e.g., a communication line. Referring to FIG. 1, the machine learning device 2 includes an alarm output unit 26, which outputs an alarm on the basis of the output from the decision unit 25 when the fan motor 11 is cleaned. As the output from the alarm output unit 26, an alarm can be output using various techniques in which, e.g., a message for prompting cleaning of the fan motor 11 is displayed on a display mounted on the motor control unit 13 or a display lamp is located at the position of interest of the operator and blinked. In response to this operation, for example, the operator can clean the fan motor (clean the fan motor and the air vents). The fan motor and the air vents can also be automatically cleaned on the basis of a signal output from the alarm output unit 26, as a matter of course.

The motor control system may include a plurality of machines 1 (1a to 1z) including driving motors 12 (12a to 12z), fan motors 11 (11a to 11z), and motor control units 13 (13a to 13z), respectively, and a plurality of machine learning devices 2 (2a to 2z) corresponding to the machines 1 (1a to 1z), respectively. Note that a to z added after each reference numeral denote a plurality of components identical to that denoted by the corresponding reference numeral. In this manner, when the motor control system includes a plurality of machines 1a to 1z and a plurality of machine learning devices 2a to 2z corresponding to the machines 1a to 1z, for example, the function updated by a value function update unit 24a of one machine learning device 2a can be used to update the functions of value function update units 24b to 24z of the remaining machine learning devices 2b to 2z.

The machine learning device 2 has the function of extracting, e.g., a useful rule, a knowledge representation, and a determination criterion based on an analysis of a set of data input to the machine learning device, outputting the determination results, and learning knowledge (machine learning). A variety of machine learning techniques are available, which are roughly classified into, e.g., "supervised learning," "unsupervised learning," and "reinforcement learning." To implement these techniques, another technique called "deep learning" in which extraction of feature amounts themselves is learned is available. These types of machine learning (machine learning device 2) are implemented by adopting, e.g., GPGPU (General-Purpose computing on Graphics Processing Units) or large-scale PC clusters. Although attention will be focused on "reinforcement learning" in this embodiment, the present invention is not necessarily limited to "reinforcement learning."

Reinforcement learning problem setting will be considered as follows:

The machine 1 (fan motor 11) observes the environmental state to decide an action (cleaning of the fan motor 11);

The environment may change according to some rules and a human may change the environment by his or her own action;

A reward signal is returned every time an action is taken;

The sum of rewards (discounts) in the future is to be maximized;

Learning starts in a state in which a result to be brought about by an action is totally unknown or known only incompletely. In other words, the machine 1 can obtain the result of an action as data only after it has actually taken that action. This means that an optimal action may be preferably searched for by trial and error; and Learning can even be started at a good starting point by starting from a state in which learning (e.g., the above-mentioned supervised learning or reverse reinforcement learning) has been performed in advance to imitate human behaviors.

In reinforcement learning, in addition to determination and classification, an action is learned to acquire a method for learning an appropriate action in consideration of interactions exerted on the environment by the action, i.e., learning to maximize the reward to be obtained in the future. This means that an action which influences the future, such as an action in which the fan motor 11 is cleaned to determine the state quantities (e.g., the current, the voltage, and the temperature) of the driving motor 12, can be acquired in this embodiment. Although this description will be followed by an example of Q-learning, the present invention is not limited to this.

In Q-learning, a value Q(s, a) of selection of an action a is learned in a particular environmental state s. In other words, an action a having the highest value Q(s, a) in the particular state s may be preferably selected as an optimal action. However, at first, a correct value Q(s, a) is totally unknown for a pair of a state s and an action a. The agent (the subject of an action) selects various actions a in the particular state s and rewards are offered for the actions a. With this operation, the agent learns to select a better action, i.e., a correct value Q(s, a).

To maximize the sum of rewards to be obtained in the future as a result of the actions, $Q(s, a) = E[(\gamma^t)r_t]$ is to be finally satisfied. The expected value in this expression is taken in response to a change in state that follows an optimal action and is an unknown value, which is learned by a search. An update expression of such a value Q(s, a) is given by, e.g.:

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

where $s_t$ is the environmental state at time t and $a_t$ is the action at time t. Upon the action $a_t$, the state changes to $s_{t+1}$. $r_{t+1}$ is the reward received upon a change in state. The term attached with max is the product of the Q-value multiplied by γ when an action a having the highest Q-value known in the state $s_{t+1}$ is selected. γ is a parameter called the discount rate, satisfying 0<γ≤1. α is a learning factor satisfying 0<α≤1.

Expression (1) represents a method for updating the evaluation value $Q(s_t, a_t)$ of the action $a_t$ in the state $s_t$, based on the reward $r_{t+1}$ returned as a result of the trial $a_t$. More specifically, when the sum of the reward $r_{t+1}$ and the evaluation value $Q(s_{t+1}, \max a_{t+1})$ of the best action max a in the state subsequent to the state s upon the action a is greater than the evaluation value $Q(s_t, a_t)$ of the action a in the state s, $Q(s_t, a_t)$ is increased; otherwise, $Q(s_t, a_t)$ is reduced. In other words, the value of a particular action in a particular state is brought close to the reward immediately returned as a result, and the value of the best action in the subsequent state upon the particular action.

Methods for representing Q (s, a) on the computer include a method for holding the numerical values of all state-action pairs (s, a) in the form of a table and a method for providing a function that approximates Q(s, a). With the latter method, above-mentioned expression (1) can be implemented by adjusting the parameter of an approximation function using a technique such as the stochastic gradient descent method. A neural network (to be described later) can be used as the approximation function.

Figure 2:
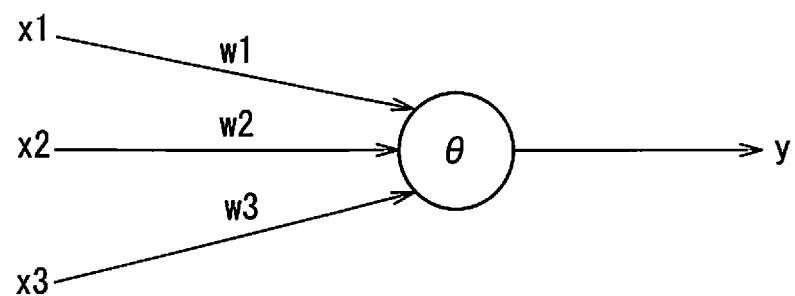
FIG. 2 is a diagram schematically representing a model for a neuron.
Figure 3:
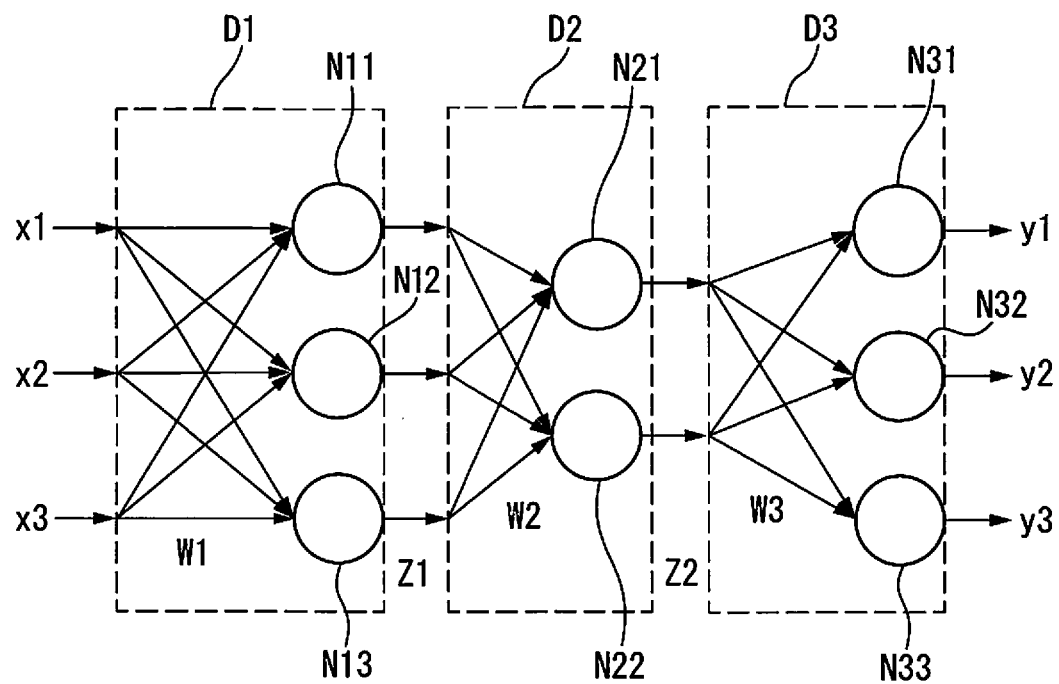
FIG. 3 is a diagram schematically representing a three-layer neural network formed by combining neurons as illustrated as FIG. 2 together.

Neural networks can also be used as approximation algorithms for value functions in reinforcement learning. FIG. 2 is a diagram schematically representing a model for a neuron, and FIG. 3 is a diagram schematically representing a three-layer neural network formed by combining neurons as illustrated as FIG. 2 together. More specifically, the neural network is implemented by, e.g., an arithmetic device and a memory imitating a model for a neuron as illustrated as, e.g., FIG. 2.

As illustrated as FIG. 2, the neurons serve to output an output (result) y for a plurality of inputs x (FIG. 2 illustrates inputs x1 to x3 as an example). Each input x (x1, x2, x3) is multiplied by a weight w (w1, w2, w3) corresponding to the input x. With this operation, the neurons output results y given by:

$$y = f_k\left(\sum_{i=1}^{n} x_i w_i - \theta\right) \quad (2)$$

where θ is the bias and $f_k$ is the activation function. Note that all of the input x, the result y, and the weight w are vectors.

A three-layer neural network formed by combining neurons as illustrated as FIG. 2 together will be described below with reference to FIG. 3. A plurality of inputs x (inputs x1 to x3 are taken as an example herein) are input from the left of the neural network and results y (results y1 to y3 are taken as an example herein) are output from the right of this network, as illustrated as FIG. 3. More specifically, the inputs x1, x2, and x3 are multiplied by a weight corresponding to each of three neurons N11 to N13 and input. The weights used to multiply these inputs are collectively referred to as w1 herein.

The neurons N11 to N13 output z11 to z13, respectively. Referring to FIG. 3, z11 to z13 are collectively referred to as feature vectors z1 and may be regarded as vectors obtained by extracting the feature amounts of input vectors. The feature vectors z1 are defined between the weights w1 and w2. Z11 to z13 are multiplied by a weight corresponding to each of two neurons N21 and N22 and are then input to the neurons. The weights used to multiply these feature vectors are collectively referred to as w2 herein.

The neurons N21 and N22 output z21 and z22, respectively. Referring to FIG. 3, z21 and z22 are collectively referred to as feature vectors z2. The feature vectors z2 are defined between the weights w2 and w3. Z21 and z22 are multiplied by a weight corresponding to each of three neurons N31 to N33 and are then input to the neurons. The weights used to multiply these feature vectors are collectively referred to as w3 herein.

Lastly, the neurons N31 to N33 output results y1 to y3, respectively. The operation of the neural network includes a learning mode and a value prediction mode. For example, the weight W is learned using a learning data set in the learning mode, and a robot action is determined in the prediction mode using the parameter. Although "prediction" has been referred to above for the sake of convenience, a variety of tasks such as detection, classification, and inference are possible, as a matter of course.

Data obtained by actually operating the robot in the prediction mode can be immediately learned and reflected on the subsequent action (online learning), or a group of data collected in advance can be used to perform collective learning and to subsequently execute the detection mode using the same parameters (batch learning). As another, intermediate approach, the learning mode can be interposed every time a certain amount of data is accumulated.

The weights w1 to w3 can be learned by the backpropagation method. The information of errors enters from the right and flows to the left. The backpropagation method is used to adjust (learn) each weight to reduce the difference between the true output y (teacher) and the output y when the input x is input. Such a neural network can have more than three layers (called deep learning). It is possible to extract features of the input stepwise to automatically acquire an arithmetic device which returns a result from only teacher data.

In view of this, the machine learning device 2 according to this embodiment includes, e.g., a state observation unit 21, a learning unit 22, and a decision unit 25 to execute Q-learning, as described above. However, the machine learning method applied to the present invention is not limited to Q-learning, as mentioned earlier. Machine learning (machine learning device 2) can be implemented by adopting, e.g., GPGPU or large-scale PC clusters, again as mentioned earlier.

Figure 4:
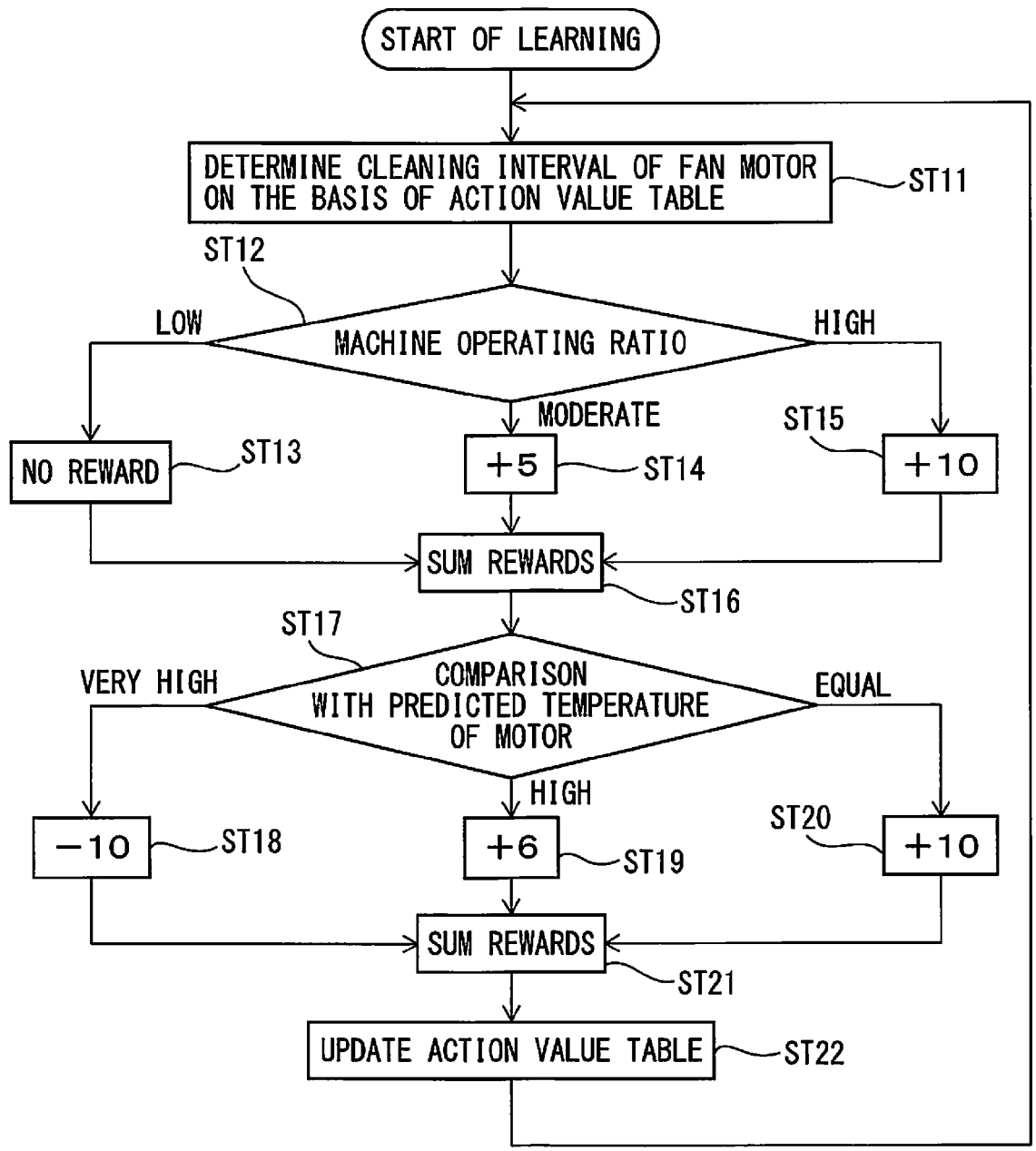
FIG. 4 is a flowchart illustrating an exemplary operation of the machine learning device illustrated as FIG. 1.

FIG. 4 is a flowchart illustrating an exemplary operation of the machine learning device illustrated as FIG. 1. As illustrated as FIG. 4, when machine learning is started (at the start of learning), the cleaning interval of a fan motor is determined on the basis of the action value table (step ST11), and the machine operating ratio is evaluated to determine a reward (reward value) (steps ST12-ST15). For example, when the operating ratio of the machine 1 is low, no reward is output (step ST13); when the operating ratio of the machine 1 is moderate, a reward of "+5" is output (step ST14); or when the operating ratio of the machine 1 is high, a reward of "+10" is output (step ST15). The reward output in any of steps ST13 to ST15 is added to the previous reward (step ST16).

A reward is determined by a comparison with the predicted temperature of the motor (steps ST17-ST20). For example, when the observed temperature of the driving motor 12 is considerably higher than the predicted temperature of the driving motor 12, a reward of "−10" is output (step ST18); when the observed temperature of the driving motor 12 is higher than the predicted temperature of the driving motor 12, a reward of "+6" is output (step ST19); or when the observed temperature of the driving motor 12 is equal to the predicted temperature of the driving motor 12, a reward of "+10" is output (step ST20).

The reward output in any of steps ST18 to ST20 is further added to the previous reward (step ST21), the action value table is updated on the basis of the summed reward (step ST22), and the same processing is repeated. The reward values output in steps ST13 to ST15 and those output in steps ST18 to ST20 are merely examples and may be changed as appropriate.

Figure 5A:
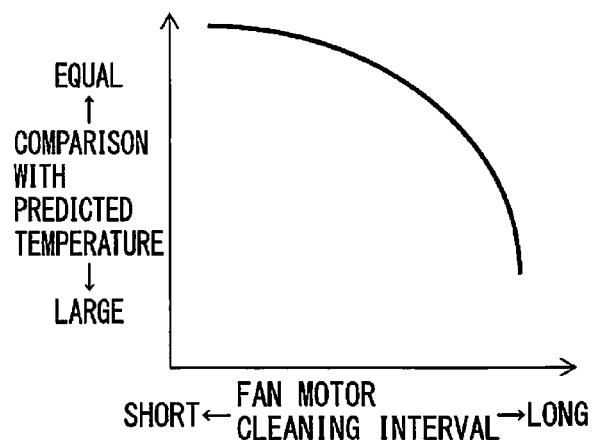
FIG. 5A, FIG. 5B and FIG. 5C illustrate graphs (type 1) for explaining an exemplary operation of the machine learning device illustrated as FIG. 1.
Figure 5B:
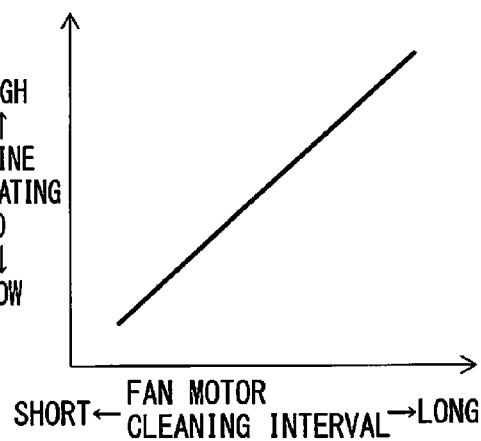
Figure 5C:
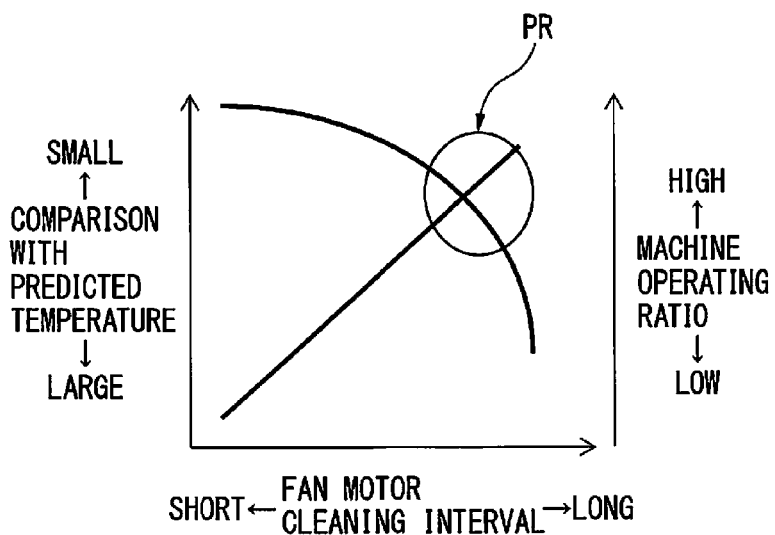

FIG. 5A to FIG. 5C, FIG. 6A and FIG. 6B illustrate graphs for explaining an exemplary operation of the machine learning device illustrated as FIG. 1. FIG. 5A illustrates the relationship between the cleaning interval of the fan motor 11 and the comparison with the predicted temperature of the driving motor 12 described with reference to steps ST17 to ST20 in FIG. 4, and FIG. 5B illustrates the relationship between the cleaning interval of the fan motor 11 and the operating ratio of the machine 1 described with reference to steps ST12 to ST15 in FIG. 4. FIG. 5C further illustrates an overlap between the characteristic curves depicted as FIG. 5A and FIG. 5B, i.e., an appropriate range of cleaning interval (learning target portion) PR of the fan motor 11 obtained by the machine learning device 2 according to this embodiment.

Figure 6A:
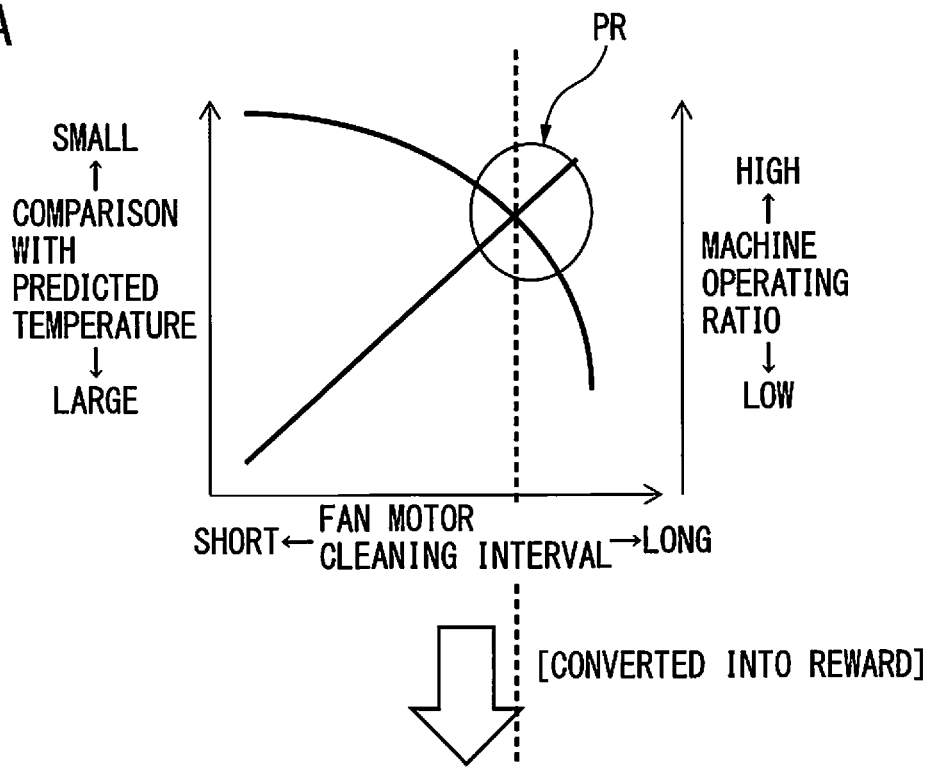
FIG. 6A and FIG. 6B illustrate graphs (type 2) for explaining another exemplary operation of the machine learning device illustrated as FIG. 1.
Figure 6B:
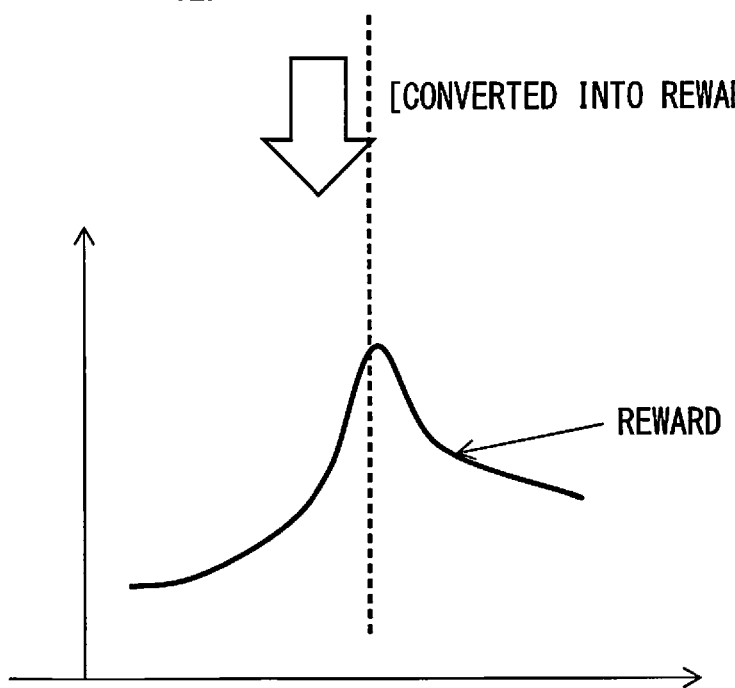

FIG. 6A is equivalent to FIG. 5A and illustrates a learning target portion PR obtained by the machine learning device 2, and FIG. 6B illustrates the learning target portion PR, represented as FIG. 6A, as converted into a reward. In other words, the machine learning device 2 learns to add the rewards output in steps ST12 to ST15 and those output in steps ST17 to ST20 in FIG. 4 to the previous reward in steps ST16 and ST21, respectively, and maximize the summed reward (step ST21) to obtain an optimal cleaning interval of the fan motor 11.

Figure 7:
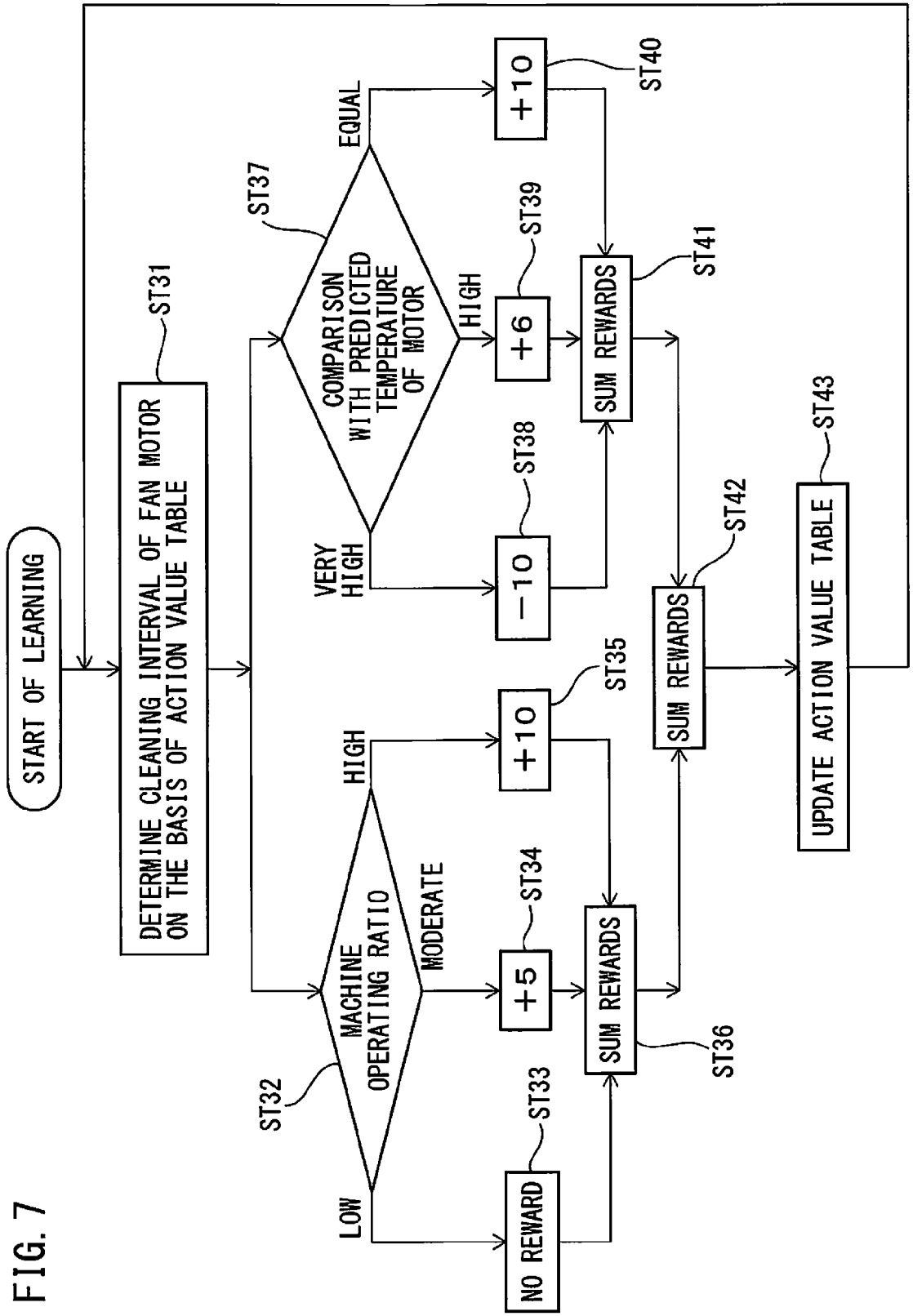
FIG. 7 is a flowchart illustrating another exemplary operation of the machine learning device illustrated as FIG. 1.

FIG. 7 is a flowchart illustrating another exemplary operation of the machine learning device illustrated as FIG. 1. As is obvious from a comparison of FIG. 7 with FIG. 4 mentioned above, steps ST32 to ST36 in FIG. 7 correspond to steps ST12 to ST16 in FIG. 4, and steps ST37 to ST41 in FIG. 7 correspond to steps ST17 to ST21 in FIG. 4. In other words, since processing for determining a reward by evaluating the machine operating ratio and processing for determining a reward by a comparison with the predicted temperature of the motor can be performed concurrently (in parallel), these types of processing are performed concurrently in the flowchart illustrated as FIG. 7. Steps ST31 and ST43 in FIG. 7 correspond to steps ST11 and ST22 in FIG. 4.

Note, however, that FIG. 7 represents additional step ST42 in which the output in step ST36 (corresponding to step ST16 in FIG. 4) in which the rewards are summed in steps ST32 to ST35 and the output in step ST41 (corresponding to step ST21 in FIG. 4) in which the rewards are summed in steps ST37 to ST40, which are processed concurrently, are added up (summed).

FIG. 8 is a table illustrating an exemplary action value table (value function) used in the machine learning device illustrated as FIG. 1 and illustrates 18 patterns indicated by numbers N1 through N18 in the vertical direction. FIG. 8 further illustrates the "Comparison with Predicted Temperature of Motor (Error between Observed Temperature of Driving Motor 12 and Predicted Temperature of Driving Motor 12)," the "Machine Operating Ratio (Operating Ratio of Machine 1)," the "Cleaning Interval (Cleaning Interval of Fan Motor 11)," the "Current State," the "Subsequent State," and the "Action Value" in the horizontal direction. Assume herein that when 'Shortened' is selected for the "Cleaning Interval," the "Comparison with Predicted Temperature of Motor" is downgraded one level and the "Machine Operating Ratio" is downgraded one level; or when 'Prolonged' is selected for the "Cleaning Interval," the "Machine Operating Ratio" is upgraded one level.

More specifically, referring to FIG. 8, as indicated by numbers N9 and N10, for example, when the "Comparison with Predicted Temperature of Motor" is 'Moderate (High: e.g., step ST19 in FIG. 4),' the reward is "+6"; or when the "Machine Operating Ratio" is 'Moderate (e.g., step ST14 in FIG. 4),' the reward is "+5" and the "Current State (Reward)" is "+11." In this case, the "Subsequent State" changes depending on whether the "Cleaning Interval" is 'Shortened' (N9) or 'Prolonged' (N10).

In other words, for N9, when the "Cleaning Interval" is 'Shortened,' the "Comparison with Predicted Temperature of Motor" is downgraded one level ('Small (Equal: e.g., step ST20 in FIG. 4)') and the "Machine Operating Ratio" is downgraded one level ('Low (e.g., step ST13 in FIG. 4)'), and this corresponds to N17 and N18 so that the reward becomes "+10+0=+10" and balancing yields an "Action Value" of '+10−11=−1.'

For N10, when the "Cleaning Interval" is 'Prolonged,' the "Comparison with Predicted Temperature of Motor" remains the same ('Moderate (High: e.g., step ST19 in FIG. 4)') and the "Machine Operating Ratio" is upgraded one level ('High (e.g., step ST15 in FIG. 4)'), and this corresponds to N3 and N4 so that the reward becomes "+6+10=+16" and balancing yields an "Action Value" of '+16−11=+5.'

In the above-mentioned case, therefore, since the "Action Value" is '−1' for N9 and is '+5' for N10, N9<N10 holds for the "Action Value" and an action defined in N10, i.e., an action in which the "Cleaning Interval" is 'Prolonged' is selected. This is merely an example and various modifications and changes may be made to, e.g., the selection of 'Shortened' or 'Prolonged' for the "Cleaning Interval" or the setting of a reward value in each case. Further, the action value table (value function) is not limited to that illustrated as FIG. 8, and various action value tables are naturally applicable.

As described above, a machine learning device, a motor control system, and a machine learning method for learning the cleaning interval of a fan motor according to the present invention can obtain an optimal cleaning interval of the fan motor to improve both the life of an electric motor and the operating ratio of a machine.

The machine learning device, the motor control system, and the machine learning method according to the present invention have the advantage of improving both the life of an electric motor and the operating ratio of a machine.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device which learns a cleaning frequency of a fan motor which cools an electric motor mounted in a machine when the fan motor is cleaned, the cleaning frequency of the fan motor being related to a life of the electric motor and an operating ratio of the machine, comprising:
   a state observation unit which observes a state variable representing a current, a voltage, a temperature and a slip of the electric motor, a cleaning interval of the fan motor, and the operating ratio of the machine; and
   a learning unit which updates an action value table for cleaning the fan motor, on the basis of the state variable observed by the state observation unit, wherein
      the cleaning interval of the fan motor is determined on the basis of the action value table.

2. The machine learning device according to claim 1, wherein the state observation unit
   receives a first state variable representing the current, the voltage, the temperature, and the slip of the electric motor from the electric motor as a feedback signal to an electric motor control unit which controls the electric motor, and
   receives a second state variable representing the cleaning interval of the fan motor and the operating ratio of the machine from the electric motor control unit.

3. The machine learning device according to claim 1, wherein
   the state observation unit further observes a state variable representing an ambient temperature of the electric motor, and
   the learning unit updates the action value table for cleaning the fan motor, in consideration of the state variable representing the ambient temperature of the electric motor observed by the state observation unit, as well.

4. The machine learning device according to claim 3, wherein the state observation unit receives a third state variable representing an ambient temperature of the electric motor from a temperature measuring unit located near the electric motor.

5. The machine learning device according to claim 1, wherein the learning unit comprises:
   a reward computation unit which computes a reward on the basis of the state variable observed by the state observation unit; and
   a value function update unit which updates a function for determining an amount of change in the cleaning interval of the fan motor from a current state variable, on the basis of the reward computed by the reward computation unit.

6. The machine learning device according to claim 5, further comprising: a decision unit which decides whether the fan motor is to be cleaned from the current state variable, on the basis of a result of learning by the learning unit.

7. The machine learning device according to claim 6, wherein the reward computation unit
   provides a smaller reward on the basis of prolongation of the cleaning interval of the fan motor, a reduction in a difference between the observed temperature of the electric motor and a predicted temperature of the electric motor, or a reduction in the operating ratio of the machine, and
   provides a larger reward on the basis of shortening of the cleaning interval of the fan motor, an increase in the difference between the observed temperature of the electric motor and the predicted temperature of the electric motor, or an increase in the operating ratio of the machine.

8. The machine learning device according to claim 6, further comprising: an alarm output unit which outputs an alarm on the basis of output from the decision unit when the fan motor is cleaned.

9. The machine learning device according to claim 1, wherein the machine learning device further comprises a neural network.

10. A motor control system comprising a plurality of machine learning devices according to claim 5, the system further comprising:
   a data exchange unit which exchanges data between the plurality of machine learning devices, wherein a function updated by a value function update unit of one machine learning device among the plurality of machine learning devices is used to update functions of value function update units of the remaining machine learning devices.

11. The motor control system according to claim 10, wherein the motor control system comprises a plurality of electric motors and a plurality of fan motors, and the machine learning device is provided in correspondence with each of the fan motors to share or exchange the state variables learned by the machine learning devices, via a communication medium.

12. A machine learning method for learning a cleaning frequency of a fan motor which cools an electric motor mounted in a machine when the fan motor is cleaned, the cleaning frequency of the fan motor being related to a life of the electric motor and an operating ratio of the machine, the method comprising:

observing a state variable representing a current, a voltage, a temperature and a slip of the electric motor, a cleaning interval of the fan motor, and the operating ratio of the machine;

updating an action value table for cleaning the fan motor, on the basis of an observed state variable; and determining the cleaning interval of the fan motor on the basis of the action value table.

13. The machine learning method according to claim 12, wherein observing the state of the machine further comprises observing a state variable representing an ambient temperature of the electric motor, and updating the action value table for cleaning the fan motor comprises updating the action value table for cleaning the fan motor, in consideration of the observed state variable representing the ambient temperature of the electric motor, as well.

\* \* \* \* \*